Patented Aug. 10, 1948

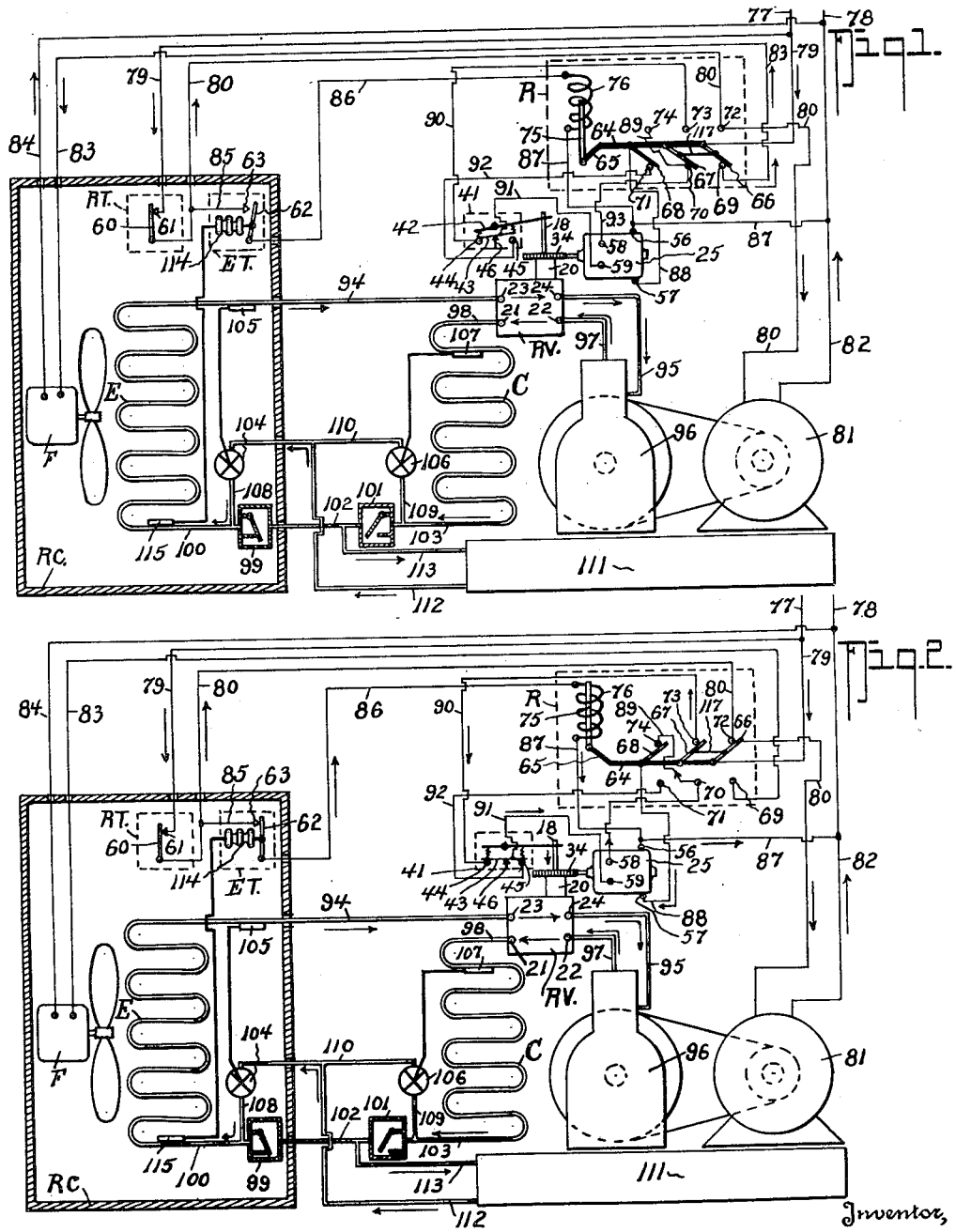

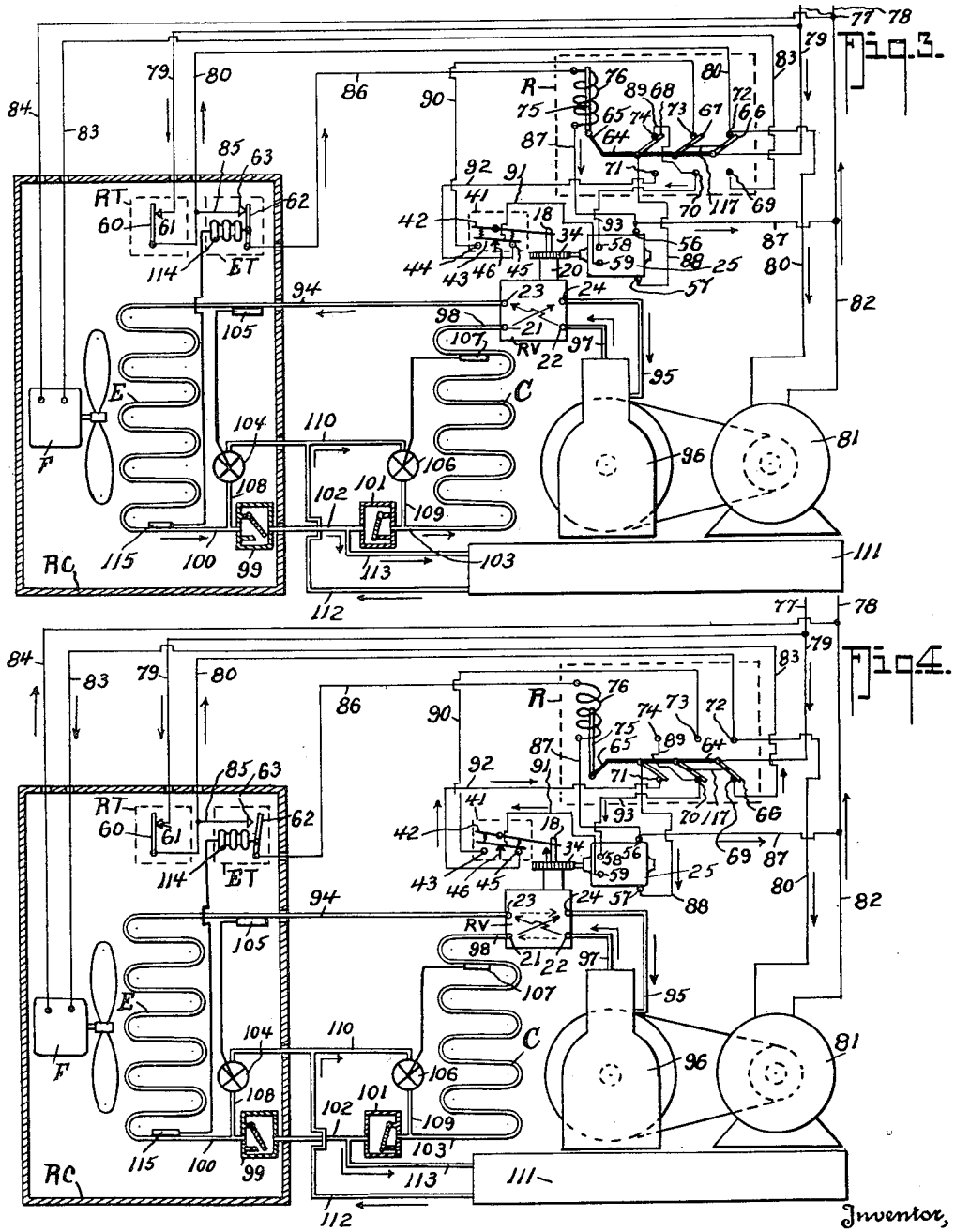

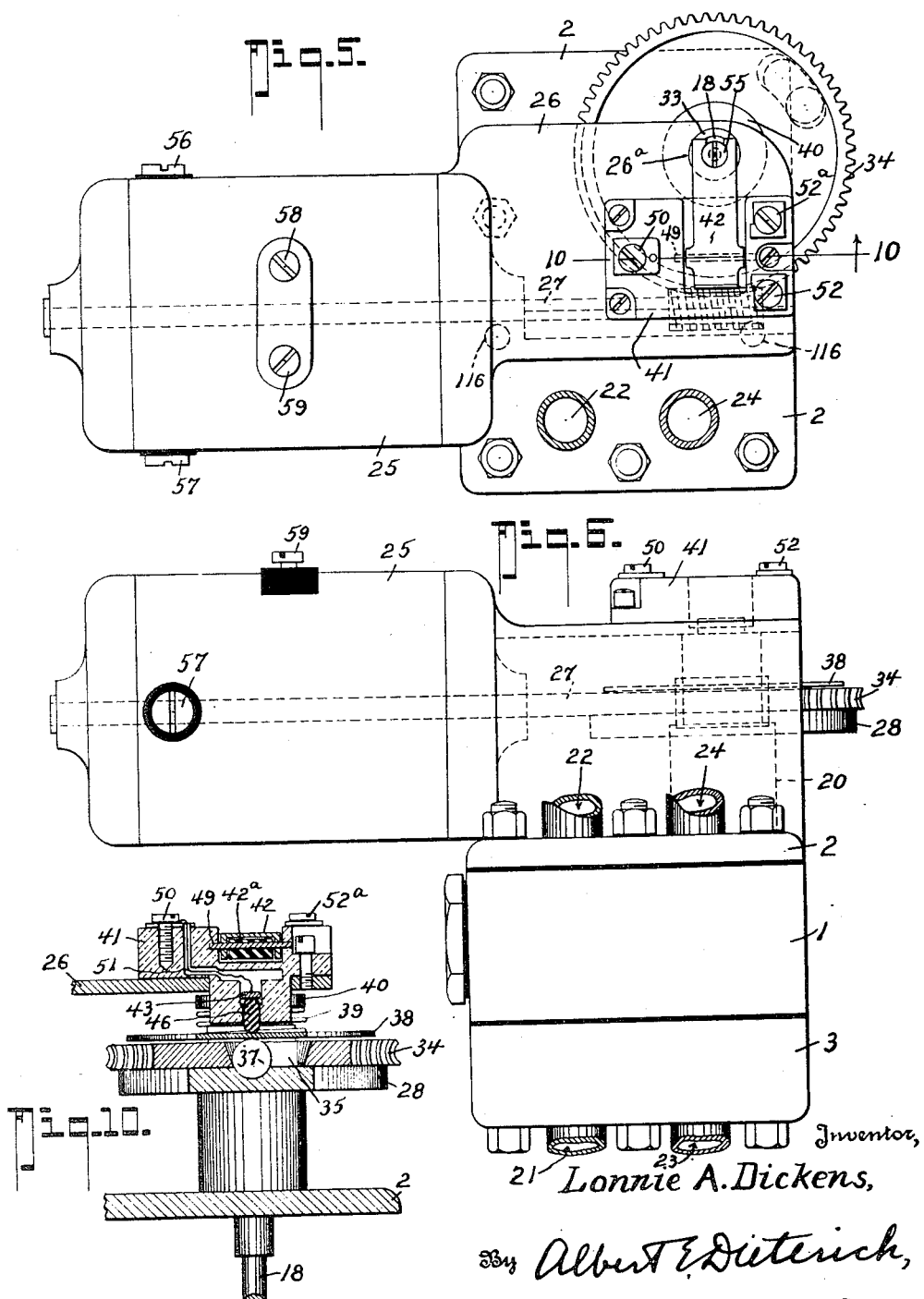

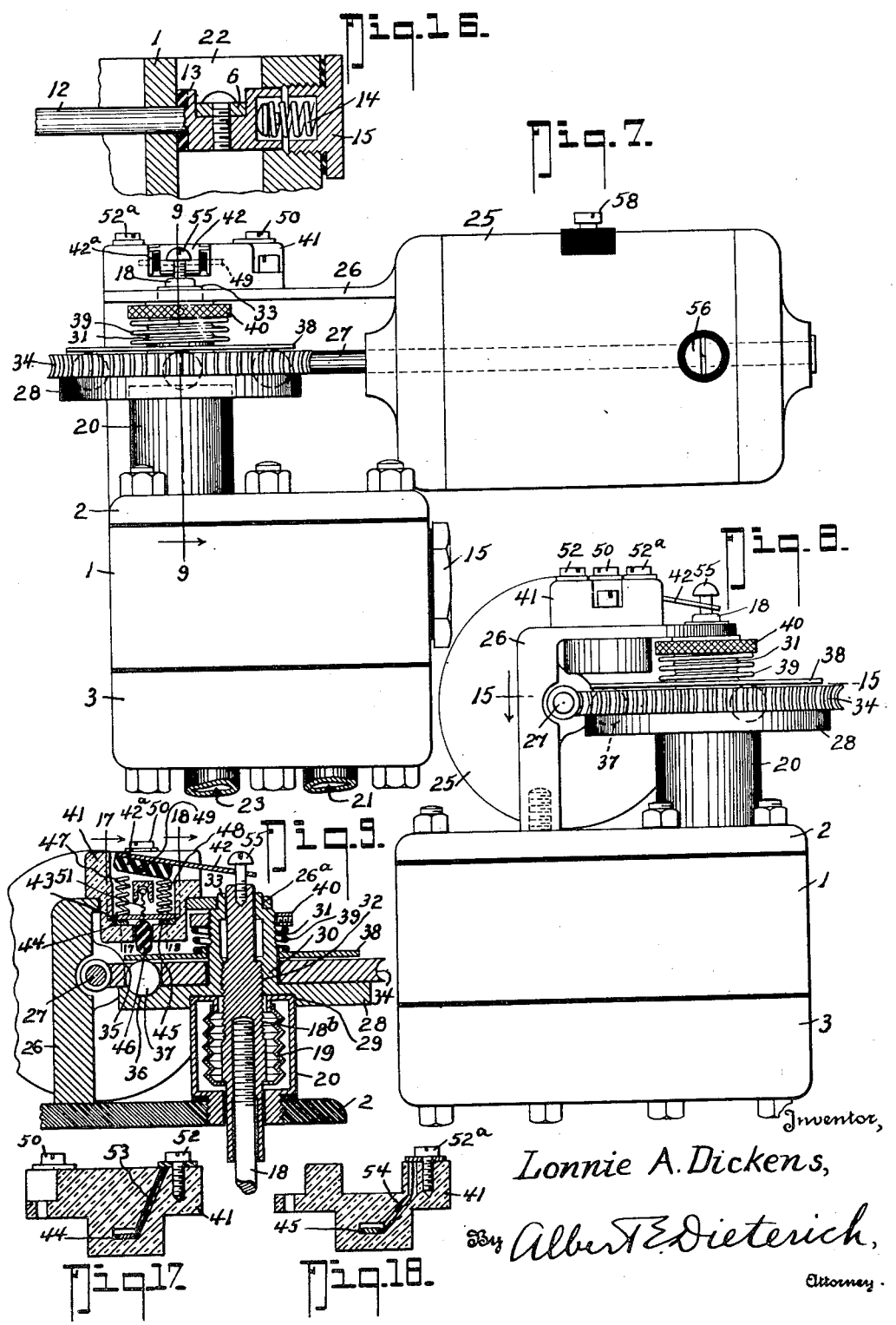

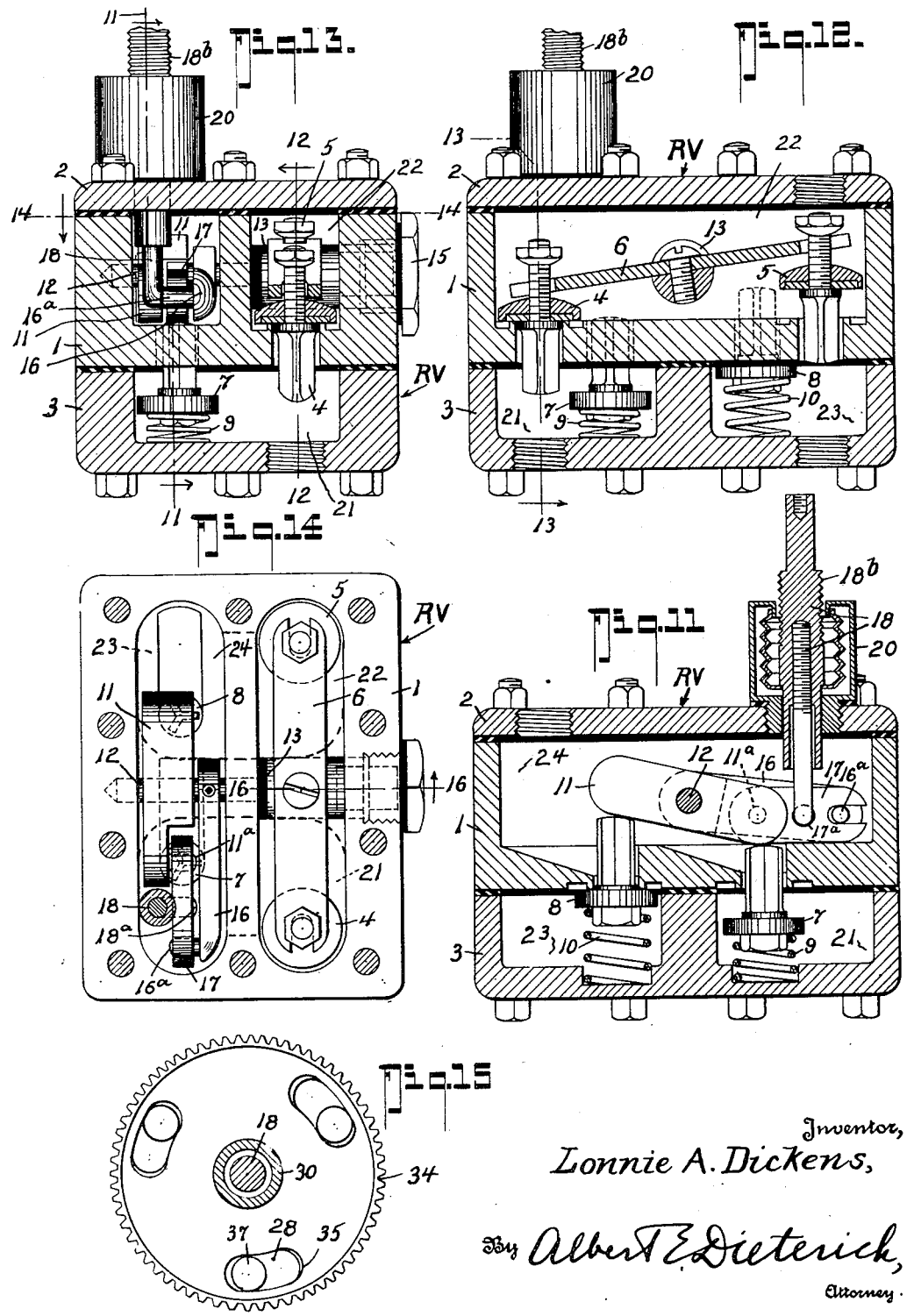

2,446,910

UNITED STATES PATENT OFFICE 2,446,910

CONTROLS AND SYSTEMS FOR DEFROSTING COOLING UNITS OF REFRIGERATING MACHINES

Lonnie A. Dickens, Archdale, N. C.

Application February 18, 1944, Serial No. 522,958

13 Claims. (Cl. 62—2)

My invention relates generally to the art of refrigeration and particularly to systems for defrosting the evaporator.

There has been in the past a great need for a completely automatic compact and efficient cooling unit which will operate at any temperature. In the present there is a far greater need for such a unit, as it has grown more important to conserve metals by compactness, power by efficiency in operation, labor by operating automatically, and recent discoveries have disclosed that food retains far more of its original value when kept at low temperatures than by any other method known to man for preserving foods, hence it is the object of the present invention to provide the hereinafter described controls and systems to make all these desirable characteristics possible and practical.

Other objects will in part be obvious and in part be pointed out hereinafter.

To the attainment of the aforesaid objects and ends the invention further resides in those novel details of construction, combinations and arrangements of parts, all of which will be first described in detail and then be specifically pointed out in the appended claims, reference being had to the accompanying drawings, in which:

Figs. 1 to 4 inclusive are diagrammatic views hereinafter specifically referred to.

Fig. 5 is a top plan view of the automatic reversing valve mechanism.

Fig. 6 is a side elevation of the same.

Fig. 7 is a side elevation of the other side of the same.

Fig. 8 is an end elevation of the same.

Fig. 9 is a detail section on the line 9—9 of Fig. 7.

Fig. 10 is a detail section on the line 10—10 of Fig. 5.

Fig. 11 is a detail cross section on the line 11—11 of Fig. 13.

Fig. 12 is a section on the line 12—12 of Fig. 13.

Fig. 13 is a section on the line 13—13 of Fig. 12.

Fig. 14 is a horizontal section on the line 14—14 of Fig. 13.

Fig. 15 is a detail section on the line 15—15 of Fig. 8.

Fig. 16 is a detail section on the line 16—16 of Fig. 14.

Fig. 17 is a detail section on the line 17—17 of Fig. 9.

Fig. 18 is a detail section on the line 18—18 of Fig. 9.

In the drawings like numerals and letters of reference indicate like parts in all the figures.

Referring now to Figs. 10 to 15 it will be seen that 1 represents the valve body or case, which is provided with two separate chambers or compartments 22 and 24 over which is secured a cap 2 having ports for communication with the respective chambers 22 and 24.

A second cap 3 is secured to the body 1 and itself has two separate chambers 21 and 23 respectively. The chamber 21 communicates with the chamber 22 via a port that is controlled by a one-way valve 4 (see Fig. 12), and with chamber 24 via a port that is controlled by a one-way valve 7, the valves 4 and 7 operating in opposite directions. The chamber 23 communicates with the chamber 22 via a port that is controlled by a one-way valve 5, and with chamber 24 via a port that is controlled by a one-way valve 8 (see Fig. 11), the valves 7 and 8 operating in the opposite directions. The valves 7 and 8 are closed by springs 9 and 10 respectively.

A rock shaft 12 is journalled in bearings in the valve body or case 1 and has a shoulder 13 that is held against the middle wall of the body by a spring 14 under a cap 15. A valve shifting lever 6 is rigidly secured to the shaft 12 and has forked ends to operatively engage with the stems of the valves 4 and 5 (see Fig. 12) so that as the lever 6 is rocked when one valve 4 or 5 opens, the other valve 5 or 4 will be closed. A second lever 11 is mounted loosely on the shaft 12 within the chamber 24 (the lever 6 being located in chamber 22), while a third lever 16 is secured, within chamber 24, to the shaft 12 (see Fig. 14). A fourth lever or link 17 is pivoted to the levers 11 and 16. The link 17 is raised and lowered by means of a rod 18 that is connected to the link and projects up through the cap 2, the passageway being sealed against communication between chamber 24 and the atmosphere by means of a bellows 19 one end of which is fixed hermetically to a housing 20 and the other end of which is hermetically connected to the rod 18. As will be seen from an inspection of Figs. 11 and 12, when the parts are positioned as shown, valves 4 and 8 will be closed and valves 5 and 7 will be open. Thus chambers 22 and 23 will be in communication and chambers 24 and 21 will be in communication. This position of the parts shown in Figs. 10 to 15 will be called hereinafter the reversed position.

If rod 18 is lifted it will carry with it the link 17, thereby rocking levers 11 and 16 and 6, causing them to open valves 4 and 8 and allow valves 5 and 7 to close thereby bringing chamber 22 into communication with chamber 21, and bringing chamber 24 into communication with chamber 23. The parts will then be in what I shall hereinafter term the normal position.

The rod 18 has an angled end 18ᵃ which fits into a hole 17ᵃ of lever 17. The lever 11 has a stud or pin 11ᵃ on which the forked lever 17 is pivoted and the lever 16 has a stud or pin 16ᵃ to work in the fork of lever 17 all as best shown in Figs. 11, 13 and 14. The rod 18 is externally threaded, as at 18ᵇ, for a purpose presently to be explained.

By referring now to Figs. 5 to 10 it will be seen that a series wound servo-motor 25 has an extension 26 which is secured to the cap 2 by some of the screws 116 that secure the caps 2 and 3 to the valve body or case.

A disc 28 has a recess 29 to fit on the housing 20 rotatably. The disc 28 has a set of spherical segment recesses or sockets 36 equally spaced about its axis. It also has a hollow hub 30 which has an externally threaded portion 31, an internally threaded portion 32 and bearing end 33 to fit within a bearing hole 26ᵃ in the extension 26 (see Fig. 9).

A worm gear 34 is rotatably mounted on the hub 30 and has a set of slots 35 (Figs. 9, 10 and 15) in which balls 37 lie. As shown, the balls are of a diameter such that when the balls rest in the sockets 36 they will project slightly above the top surface of the gear 34. A disc or plate 38 is apertured to fit over the hub 30 and lie on the balls 37. The disc 38 is held down under pressure of a spring 39 whose force is adjustable by a ring nut 40 screwed on the threaded part 31 of the hub 30.

Mounted on a part of the extension 26 is a control switch 41 in a slot of which is pivoted, on a pin 49, a switch arm 42 having an insulation block 42ᵃ. A pair of fixed contacts 44 and 45 are located in the bottom of the slot and spaced apart. A floating contact member 43 is forced into contact with the contacts 44, 45 by springs 47 and 48 which engage the insulation 42ᵃ one at each side of the pivot 49. The switch 41 includes a circuit breaking pin 46 which when forced upward will lift the floating contact member from the contacts 44, 45 and break the circuits connected to one or the other contacts 44 or 45 according to the position of the arm 42 as will later more fully appear.

A terminal screw 50 is electrically connected to the floating contact member 43 by a wire 51 (Fig. 10). A terminal screw 52 is electrically connected with contact 44 by a wire 53 (Fig. 17) and a terminal screw 52ᵃ is electrically connected to contact 45 by a wire 54 (Fig. 18).

The rod 18 has a headed end 55 under which the switch arm 42 projects so as to be engaged by the head on the down travel of the rod. The arm 42 is engaged by the upper enlargement of the rod on the up travel of the rod 18, a limited amount of play being permitted.

56 and 57 indicate the armature terminals of the servo-motor 25 and 58 and 59 indicate the field terminals of the same.

As the worm 27 on the shaft of the motor 25 turns the worm gear 34 in one direction rod 18 will be lifted and as the gear 34 is turned in the opposite direction the rod 18 will be lowered.

The balls 37 yieldingly connect the gear 34 to the disc 28. The compression of the spring 39 by the nut 40 determines the force necessary to raise the balls 37 out of the sockets 36. By this means the tension exerted on the valve elements of valve RV in either normal or reversed position is adjustable by nut 40 as disc 28 ceases to revolve with gear 34 when proper force has been exerted on valves 4 and 8 or 5 and 7 to seat them properly.

When valve RV is moved to reversed position by rod 18 the right hand end of switch arm 42 is also moved down which relieves tension on spring 47 and applies more tension on spring 48 so that when sufficient force has been applied on valves 4 and 8 and balls 37 are forced out of sockets 36 thereby raising plate 38 against pin 46 which forces up contact 43, which breaks connection with contact 44 and leaves connection to contact 45 as one end of "floating" contact 43 is held down by spring 48 while the other end is allowed to rise by spring 47 from which pressure has been relieved. Motor 25 is reversed to return valve RV to normal position and raises rod 18 which lifts right hand end of switch arm 42 increasing tension on spring 47 and decreasing tension on spring 48. When valves 5 and 7 are seated pin 46 is lifted in the same manner as in reversed position but breaks connection between contacts 43 and 45 and leaves connection from contact 43 to 44 as spring 47 holds end of contact 43 against contact 44 but as tension on spring 48 is relieved one end of contact 43 is lifted from contact 45.

Figs. 1 to 4 inclusive illustrate the electrical system for controlling the operation of the fully automatic defrosting valve mechanism. Fig. 1 shows the normal position of the parts during the cooling cycle. Fig. 2 shows the position of the parts at the beginning of the defrosting cycle, the evaporator thermostat having just closed and the servo-motor operating to lower rod 18 for the purpose of reversing valve RV, rod 18 being just about to cause the reversal of the valves. Fig. 3 shows the position of the parts when valve RV has been reversed and rod 18 is all the way down, servo-motor circuit is open, RV reversed and defrosting cycle is on.

Fig. 4 shows the position of the parts at the end of the defrosting cycle, relay R's magnet 75 de-energized by opening of contacts 62, 63, of evaporator thermostat ET, servo-motor circuit energized to effect reverse action of motor worm and gear 34 and rod 18 beginning to rise to restore reversing valve RV to the normal position. In Figs. 1 to 4, 115 represents a bulb connected to an evaporator thermostat ET whose bellows 114 operates a movable switch arm 62 out of and into contact with a fixed contact 63. Contact 63 is connected to conductor 80 while contact 62 is connected, via wire 86 to one terminal of a solenoid 76 of a relay R. The relay R has six fixed contacts 69 to 74 inclusive and three movable contact arms 66, 67 and 68, the latter being mechanically connected to and insulated from the armature 75 of the relay to move as one. The arms 66 and 67 are electrically connected together as at 117.

The other terminal of the solenoid 76 is electrically connected by wire 87 to one of the armature terminals 56 while the other armature terminal 57 is electrically connected by wire 88 to arm 68. One of the field coil terminals 58 of motor 25 is connected by wire 93 to fixed contact 70, while the other terminal 59 of the field coil is connected by wire 91 to contact 43 of switch 41. Contact 44 of switch 41 is connected by wire 90 to contact 73 and contact 45 of switch 41 is connected by wire 92 to contact 71.

Contact 72 is connected to wire 80 and contact 69 is connected to wire 83. Contacts 74 and 70 are electrically connected as at 89. Armature terminal 56 is connected by wire 87 to wire 82.

The room thermostat RT has a fixed contact 61 and a movable contact 60. The contact 60 is connected to wire 80 while contact 61 is connected by wire 79 through the switch arm 66 and the wire 80 to the motor 81 which drives the compressor 96, and to the line wire 77. Line wire 78 also connects to motor 81 via wire 82. A wire 83 connects contact 69 with fan F. The fan is connected to line wire 78 by a wire 84. Contacts 70 and 74 are connected by a wire 89.

The evaporator E has its upper end connected by duct 94 with valve chamber 23. The upper end of the condenser C is connected by duct 98 with valve chamber 21. The outlet side of the compressor 96 is connected by a duct 97 with valve chamber 22 while the inlet side of the compressor is connected by a duct 95 with valve chamber 24. The lower end of the evaporator E is connected by duct 100 with a back check valve 99 and by a branch duct 108 with an expansion valve 104. The expansion valve 104 may be of the usual construction employed in refrigerating systems and be controlled in the usual way by a thermostat 105.

The lower end of the condenser C is connected by duct 103 to a back check valve 101 and by a branch duct 109 with an expansion valve 106 that is of the usual construction and is controlled in the usual way by a thermostat 107.

The expansion valves 104 and 106 are connected together as at 110 and to a duct 112 leading from a receiver 111. Also the check valves 99 and 101 have their outlet sides connected together, as at 102, and to the duct 113 that leads to the receiver 111.

The bellows 114 of the evaporator thermostat ET is operated through a bulb 115.

The motor driven mechanism for operating the defrosting valve RV as described above is controlled by the above described electrical system as follows: The refrigerant system operates as previously described and during continued periods of operation, in cooling cycle, accumulates frost on evaporator E and as this frost becomes dense enough to reduce the movement of air by fan F or, if no fan is used, to restrict the movement of air by gravity then the temperature of evaporator is reduced excessively because of the lack of air from which to absorb heat. When the temperature of evaporator E is reduced sufficiently to cool bulb 115 of evaporator thermostat ET to such a point as thermostat ET is adjusted to close its contacts, the circuit will be closed between contacts 62 and 63 (Fig. 1).

One contact 63 of thermostat ET is connected via wire 85 to conductor 80 which is connected to the "load" side of room thermostat RT therefore when room thermostat is closed conductor 80 will be energized. If room thermostat RT is closed and low temperature of evaporator E causes contacts of evaporator thermostat ET to close, the solenoid 76 of relay R is energized through conductor 86 to conductor 87, this action reverses the defrosting valve RV as will be hereinafter explained. With the defrosting valve RV in reversed position the refrigerant system operates in the defrost cycle and raises the temperature of evaporator E as before described and when sufficient heat is introduced to raise temperature of evaporator E above the freezing point thereby melting off the accumulation of ice and also the temperature of bulb 115 is raised which opens the contacts 62, 63 of evaporator thermostat ET, this breaks the circuit from conductor 80 to conductor 86 and thus de-energizes relay solenoid 76.

Relay R has, as before stated, six stationary contacts 69, 70, 71, 72, 73 and 74 and three contact arms 66, 67 and 68 which are mounted on a movable body or shaft 64 whose crank arm 65 is connected with solenoid core 75 and which body is drawn to the reverse position as shown in Figs. 2 and 3 by solenoid 76 but when solenoid 76 is de-energized the contact arms are moved by a spring or gravity to normal position as shown in Figs. 1 and 4.

Relay R has three functions and they are listed with their method of accomplishment as follows:

First, when relay arms 69, 70 and 71 are drawn to reverse position by solenoid 76, arm 66, which is connected to conductor 79, is drawn away from contact 69 thus de-energizing conductor 83 thereby stopping fan F so as to prevent circulation of air over evaporator E during defrosting cycle.

Second, arm 66 is drawn against contact 72 thus connecting conductor 79 directly to conductor 80 thereby by-passing room thermostat RT so that motor 81 and compressor 96 continue to run until evaporator E is completely defrosted.

Third, the relay R is to "reverse" the motor 25 when relay R is reversed by solenoid 76 and to operate motor 25 forward when relay R returns to normal, that is solenoid 76 is de-energized. This reverse and forward motion of motor 25 will be for the purpose of moving defrosting valve RV from reverse to normal position as solenoid 76 is energized and de-energized by evaporator thermostat ET.

Control switch 41 is for the purpose of stopping motor 25 when valve RV is moved into either normal or reversed position and is operated as described above, by the position of valve RV and the tension exerted on valves 4 and 8 or 5 and 7 by motor 25 through the drive mechanism.

When relay R is in normal position (Fig. 1) and evaporator thermostat ET is open valve RV connects the outlet side of the compressor with the top or inlet side of the condenser C; the inlet side of the compressor is connected by valve RV with the top or outlet side of the evaporator E. Check valve 99 is closed and check valve 101 is open. With room thermostat RT closed, current flows as indicated by the arrows in Fig. 1, energizing motor 81 and fan F.

When sufficient frost has accumulated on the evaporator E, as hereinbefore stated, to operate thermostat ET to close its circuit, relay R is energized to move its blades to the position shown in Fig. 2 whereupon current flows as indicated by the arrows in Fig. 2 to energize servo-motor 25 and lower rod 18. Fig. 2 shows the position of the parts when motor 25 has begun to operate and before reversing valve RV has had the position of its valves reversed. As rod 18 continues down valve RV will effect its reversing function to operatively connect chamber 22 with chamber 23 and chamber 21 with chamber 24 thereby reversing the flow of refrigerant in evaporator E and condenser C and thereby reversing their respective functions as it were.

As soon as rod 18 passes from position of Fig. 2 to the position shown in Fig. 3 the rod will have reached its lower limit of travel and be stopped there. This causes balls 37 to be rolled out of their sockets 36, thereby raising plate 38 which pushes up pin 46, which in turn lifts contact 43 off from contact 44 (Fig. 3) and opens the servomotor circuit, thereby stopping the motor 25. The solenoid 76 of relay R remains energized and the parts retain the position of Fig. 3 until the defrosting has been completed.

As soon as the defrosting has been completed relay ET opens the circuit at contacts 62, 63 which de-energizes solenoid 76 and the blades of relay R are restored to their normal position (by spring or gravity). The parts then are in the position shown in Fig. 4. The circuit of motor 25 is again reversed from that of Fig. 4 to that of Fig. 1 thereby running up rod 18 and restoring valve RV to its normal position. As soon as rod 18 reaches its upper limit of movement balls 37 again are rolled out of their sockets to raise disc 38 and pin 46 to lift contact 43 from engaging contact 45 to break the circuit of motor 25.

It should be stated that the slots 35 are provided so that the motor can start up more freely before the balls are contacted to roll them forward into the next socket 36 to lower disc 72 and release pressure on pin 46 so contact 43 can engage both contacts 44 and 45 in passing from position of Fig. 1 to that of Fig. 4 and back again from that of Fig. 4 (via Figs. 3 and 2) to Fig. 1.

The operation of defrosting, it will be seen, is independent of the room temperature of case RC which temperature is controlled by the setting of thermostat RT at any desired degree.

The defrosting function is solely dependent on the amount of frost on the evaporator E.

It will be noted that when the apparatus is operating on the cooling cycle (Fig. 1) the pressure of refrigerant passing through condenser opens check valve 101 and closes check valve 99. The lower pressure in the evaporator E due to the suction action of the compressor 96 assists in holding valve 99 closed. On reversing the flow of refrigerant (defrosting cycle) the higher pressure is on the inlet side of valve 99 and the lower pressure is on the inlet side of valve 101. Hence the flow of refrigerant into and out of the receiver 111 is always in one direction and does not reverse therein as it does in compressor C and evaporator E as hereinbefore described.

From the foregoing description taken in connection with the accompanying drawings it is thought the complete construction, operation and advantages of the invention will be clear to those skilled in the art to which it appertains.

What I claim is:

1. In a refrigerating system wherein is provided a compressor, a condenser, a receiver and an evaporator and operating connections between the same by virtue of which operating connections refrigerating fluid is normally condensed in the condenser and evaporated in the evaporator, the evaporator being located in a chamber to be cooled: the improvement which comprises mechanism to reverse the operations of the condenser and the evaporator for defrosting purposes, said mechanism including a reversing valve operatively connected to both sides of the compressor and to one end of each said evaporator and said condenser and separate expansion valves for the condenser and evaporator and thermostat means for controlling said expansion valves.

2. In a refrigerating system wherein is provided a compressor, a condenser, a receiver and an evaporator and operating connnections between the same by virtue of which operating connections refrigerating fluid is normally condensed in the condenser and evaporated in the evaporator, the evaporator being located in a chamber to be cooled: the improvement which comprises mechanism to reverse the operations of the condenser and the evaporator for defrosting purposes, said mechanism including a reversing valve operatively connected to both sides of the compressor and to one end of each said evaporator and said condenser and separate expansion valves for the condenser and evaporator and means for controlling said expansion valves, means by which the reversing valve may be moved to and held in the reversed position and means for restoring the reversing valve to normal position when defrosting shall have been completed.

3. In a refrigerating system wherein is provided a compressor, a condenser, a receiver and an evaporator and operating connections between the same by virtue of which operating connections refrigerating fluid is normally condensed in the condenser and evaporated in the evaporator, the evaporator being located in a chamber to be cooled: the improvement which comprises mechanism to reverse the operations of the condenser and the evaporator for defrosting purposes, said mechanism including a reversing valve operatively connected to both sides of the compressor and to one end of each said evaporator and said condenser and separate expansion valves for the condenser and evaporator and means for controlling said expansion valves, means by which the reversing valve may be moved to and held in the reversed position and means for restoring the reversing valve to normal position when defrosting shall have been completed, said restoring means including an electrically operated temperature controlled mechanism for releasing said reversing valve from its reversed position and moving it back to its normal position.

4. In a refrigerating system wherein is provided a compressor, a condenser, a receiver and an evaporator and operating connections between the same by virtue of which operating connections refrigerating fluid is normally condensed in the condenser and evaporated in the evaporator, the evaporator being located in a chamber to be cooled: the improvement which comprises mechanism to reverse the operations of the condenser and the evaporator for defrosting purposes, said mechanism including a reversing valve operatively connected to both sides of the compressor and to one end of each said evaporator and said condenser and separate expansion valves for the condenser and evaporator and means for controlling said expansion valves, means by which the reversing valve may be moved to and held in the reversed position and means for restoring the reversing valve to normal position when defrosting shall have been completed, said restoring means including means continuously tending to move the reversing valve to normal position, and electrically actuated means for releasing the means that hold the reversing valve in reversed position.

5. In refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a back check valve connected with the other end of the evaporator and with its expansion valve and with the intake of the receiver; a back check valve connected with the other end of the condenser and with its expansion valve and with the intake of the receiver; and means for operating the reversing valve from normal position to reverse position to reverse the cycle of operation of the apparatus.

6. In refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a back check valve connected with the other end of the evaporator and with its expansion valve and with the intake of the receiver; a back check valve connected with the other end of the condenser and with its expansion valve and with the intake of the receiver; and means for operating the reversing valve from normal position to reverse position to reverse the cycle of operation of the apparatus, said last named means including a valve-shifting rod, and means for shifting said rod to the reverse position.

7. In a refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a back check valve connected with the other end of the evaporator and with its expansion valve and with the intake of the receiver; a back check valve connected with the other end of the condenser and with its expansion valve and with the intake of the receiver; and means for operating the reversing valve from normal position to reverse position to reverse the cycle of operation of the apparatus, said last named means including a valve-shifting rod, means to move said rod from a normal position to its reverse-valve position, means by virtue of which said rod is held in the reverse-valve position until defrosting shall have been completed, and means for thereafter returning said rod to its normal position.

8. In refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a check valve connected with the other end of the evaporator and its expansion valve and with the intake of the receiver; a check valve connected with the other end of the condenser and its expansion valve and with the intake of the receiver; and means for operating the reversing valve from normal position to reverse position to reverse the cycle of operation of the apparatus, said last named means including a valve-shifting rod, motor-actuated means for shifting said rod to reverse and restoring to normal said reversing valve at pre-determined times.

9. In refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a back check valve connected with the other end of the evaporator and with its expansion valve and with the intake of the receiver; a back check valve connected with the other end of the condenser and with its expansion valve and with the intake of the receiver; and means for operating the reversing valve from normal position to reverse position to reverse the cycle of operation of the apparatus, said last named means including a valve-shifting rod, motor-actuated means for shifting said rod to reverse and restore to normal said reversing valve at pre-determined times, said motor-actuated means including an electric motor, a disc having a hub threaded on said rod, means to hold said disc for movement in a single plane whereby when the disc is turned said rod will be moved in one direction or the other according to the direction in which the disc is turned, a gear mounted to turn on said hub, said gear being driven by said motor, said gear having slots and said disc having sockets corresponding to said slots, balls in said slots and sockets, a plate pivoted on said hub over said balls, adjustable spring means holding said plate on said balls, a control switch operatively connected to said rod and with said plate, and means operatively connected with said control switch for reversing the operations of said motor under pre-determined conditions.

10. In refrigeration apparatus: a compressor; a condenser; an evaporator; a receiver; a reversing valve connected with the pressure and suction sides of the compressor and with one end only of each the condenser and the evaporator; an expansion valve for each the condenser and the evaporator; a connection between the outlet of the receiver and the inlet of each expansion valve; a back check valve connected with the other end of the evaporator and with its expansion valve and with the intake of the receiver; a back check valve connected with the other end of the condenser and with its expansion valve and with the intake of the receiver; and means for operating the reversing valve from normal position to reverse position to reverse the cycle of operation of the apparatus, said last named means including a valve-shifting rod, motor-actuated means for shifting said rod to reverse and restore to normal said reversing valve at pre-determined times, said motor-actuated means including an electric motor, a disc having a hub threaded on said rod, means to hold said disc for movement in a single plane whereby, when the disc is turned, said rod will be moved in one direction or the other according to the direction in which the disc is turned, a gear mounted to turn on said hub, said gear being driven by said motor, and a spring-loaded releasable connection between said disc and said gear, a control switch operatively connected to said rod and with said motor, and means operatively connected with said control switch for reversing the operations of said motor under pre-determined conditions.

11. In a refrigeration system, a compressor driven by an electric motor, a condenser, an evaporator, a duct connecting the lower ends of the condenser and evaporator together, two expansion valves in said duct, a thermostat located adjacent said evaporator and operatively connected to one of said expansion valves, a thermostat adjacent said condenser and operatively connected to the other of said expansion valves, a back check valve to whose intake side one end of said evaporator is operatively connected, a second back check valve to whose intake side one end of said condenser is operatively connected, a receiver having an inlet and an outlet, a duct connecting the outlet sides of both said check valves to the inlet of said receiver, a duct operatively connecting the outlet of said receiver to said duct between said expansion valves, in combination with a reversing valve unit operatively connecting said compressor with said evaporator and with said condenser and adapted when in one position to connect the outlet side of said compressor with the other end of said condenser and the inlet side of said compressor with the other end of said evaporator and when in a reversed position adapted to connect the outlet side of said compressor with said other end of said evaporator and the inlet side of said compressor with said other end of said condenser, a servo-motor operatively connected with said reversing valve unit for moving it from one position to the other, and thermostatically controlled means for operating said servo-motor according to the amount of frost on the evaporator to periodically defrost the same.

12. In a refrigeration system, a compressor driven by an electric motor, a condenser, an evaporator, a duct connecting the lower ends of the condenser and evaporator together, two expansion valves in said duct, a thermostat located adjacent said evaporator and operatively connected to one of said expansion valves, a thermostat adjacent said condenser and operatively connnected to the other of said expansion valves, a back check valve to whose intake side one end of said evaporator is operatively connected, a second back check valve to whose intake side one end of said condenser is operatively connected, a receiver having an inlet and an outlet, a duct connecting the outlet sides of both said check valves to the inlet of said receiver, a duct operatively connecting the outlet of said receiver to said duct between said expansion valves, in combination with a reversing valve unit operatively connecting said compressor with said evaporator and with said condenser and adapted when in one position to connect the outlet side of said compressor with the other end of said condenser and the inlet side of said compressor with the other end of said evaporator and when in a reversed position adapted to connect the outlet side of said compressor with said other end of said evaporator and the inlet side of said compressor with said other end of said condenser, a servo-motor operatively connected with said reversing valve unit for moving it from one position to the other, an evaporator thermostat operatively associated with said evaporator, a relay electrically connected with said evaporator thermostat, a control switch operatively electrically connected with said servo-motor and with said relay for opening and closing the motor circuit and cooperating with said relay for reversing the action of said motor on said reversing valve unit to effect alternately a cooling cycle and a defrosting cycle of the refrigerating system under the control of said evaporator thermostat.

13. In a refrigeration system, a compressor driven by an electric motor, a condenser, an evaporator, a duct connecting the lower ends of the condenser and evaporator together, two expansion valves in said duct, a thermostat located adjacent said evaporator and operatively connected to one of said expansion valves, a thermostat adjacent said condenser and operatively connected to the other of said expansion valves, a back check valve to whose intake side one end of said evaporator is operatively connected, a second back check valve to whose intake side one end of said condenser is operatively connected, a receiver having an inlet and an outlet, a duct connecting the outlet sides of both said check valves to the inlet of said receiver, a duct operatively connecting the outlet of said receiver to said duct between said expansion valves, in combination with a reversing valve unit operatively connecting said compressor with said evaporator and with said condenser and adapted when in one position to connect the outlet side of said compressor with the other end of said condenser and the inlet side of said compressor with the other end of said evaporator and when in a reversed position adapted to connect the outlet side of said compressor with said other end of said evaporator and the inlet side of said compressor with said other end of said condenser, a servo-motor operatively connected with said reversing valve unit for moving it from one position to the other, and thermostatically controlled means for operating said servo-motor according to the amount of frost on the evaporator to periodically defrost the same, said last named means including an evaporator thermostat, an electromagnetically operated relay operatively connected with said evaporator thermostat and with said servo-motor for operating said motor to move said reversing valve unit from its normal position to its reversed position, holding said valve unit in the reversed position until defrosting has been accomplished and then returning said valve unit to its normal position.

LONNIE A. DICKENS.

REFERENCES CITED

The following references are of record in the file of this patent:

UNITED STATES PATENTS

| Number | Name | Date |
|---|---|---|
| 2,143,687 | Crago | Jan. 10, 1939 |
| 2,218,793 | Horton et al. | Oct. 22, 1940 |
| 2,384,210 | Sunday | Sept. 4, 1945 |